United States Patent
Park et al.

(10) Patent No.: US 9,907,328 B2
(45) Date of Patent: Mar. 6, 2018

(54) CELLULOSE-ADIPATE-#-CYCLODEXTRIN STRUCTURE, AND PREPARATION METHOD THEREFOR

(71) Applicant: MEDIENCE CO., LTD., Chuncheon-si, Gangwon-do (KR)

(72) Inventors: Sang Jae Park, Youngin-si (KR); Byung Sik Kang, Chuncheon-si (KR)

(73) Assignee: MEDIENCE CO., LTD., Chuncheon-si (KR)

( * ) Notice: Subject to any disclaimer, the term of this patent is extended or adjusted under 35 U.S.C. 154(b) by 0 days.

(21) Appl. No.: 15/327,990

(22) PCT Filed: Jul. 22, 2015

(86) PCT No.: PCT/KR2015/007606
§ 371 (c)(1),
(2) Date: Jan. 20, 2017

(87) PCT Pub. No.: WO2016/013866
PCT Pub. Date: Jan. 28, 2016

(65) Prior Publication Data
US 2017/0143016 A1    May 25, 2017

(30) Foreign Application Priority Data
Jul. 22, 2014 (KR) .......................... 10-2014-0092320

(51) Int. Cl.
| A23L 1/015 | (2006.01) |
| A23L 3/3562 | (2006.01) |
| A23L 5/20 | (2016.01) |
| A23C 9/142 | (2006.01) |
| A23C 23/00 | (2006.01) |
| C08B 3/12 | (2006.01) |
| A23C 7/04 | (2006.01) |

(Continued)

(52) U.S. Cl.
CPC ............ *A23L 3/3562* (2013.01); *A23C 7/043* (2013.01); *A23C 9/14* (2013.01); *A23C 9/142* (2013.01); *A23C 23/00* (2013.01); *A23L 5/20* (2016.08); *C08B 3/12* (2013.01); *C08B 15/005* (2013.01); *C08B 37/0012* (2013.01); *A23V 2002/00* (2013.01)

(58) Field of Classification Search
CPC    A23V 250/5108; A23V 2002/00; C08B 3/00; C08B 3/12; C08B 7/00; C08B 15/10; C08B 15/005
USPC ................................. 426/271, 422, 490, 648
See application file for complete search history.

(56) References Cited

FOREIGN PATENT DOCUMENTS

| EP | 1808181 A1 | 7/2007 |
| KR | 10-0319784 B1 | 7/2002 |

(Continued)

OTHER PUBLICATIONS

Challa, Rajeswari et al., "Cyclodextrins in drug delivery: an updated review", AAPS PharmSciTech, Oct. 14, 2005, vol. 6, No. 2, pp. E329-E357.

*Primary Examiner* — Helen F Heggestad
(74) *Attorney, Agent, or Firm* — Maschoff Brennan

(57) ABSTRACT

The present invention relates to a structure composed of β-cyclodextrin, a linker and a supporter, and a preparation method thereof. The cellulose-adipate-β-cyclodextrin structure of the present invention is effective in removing cholesterol from foods, and the use of the cellulose-adipate-β-cyclodextrin structure may reduce the onset of adult and chronic diseases due to excessive intake of cholesterol, thereby contributing to maintenance, recovery and promotion of health.

12 Claims, 1 Drawing Sheet

(51) Int. Cl.
    *A23C 9/14*     (2006.01)
    *C08B 15/00*     (2006.01)
    *C08B 37/16*     (2006.01)

(56) References Cited

FOREIGN PATENT DOCUMENTS

| | | |
|---|---|---|
| KR | 10-2004-0054319 A | 6/2004 |
| KR | 10-2005-0097215 A | 10/2005 |
| KR | 10-2007-0087708 A1 | 8/2007 |

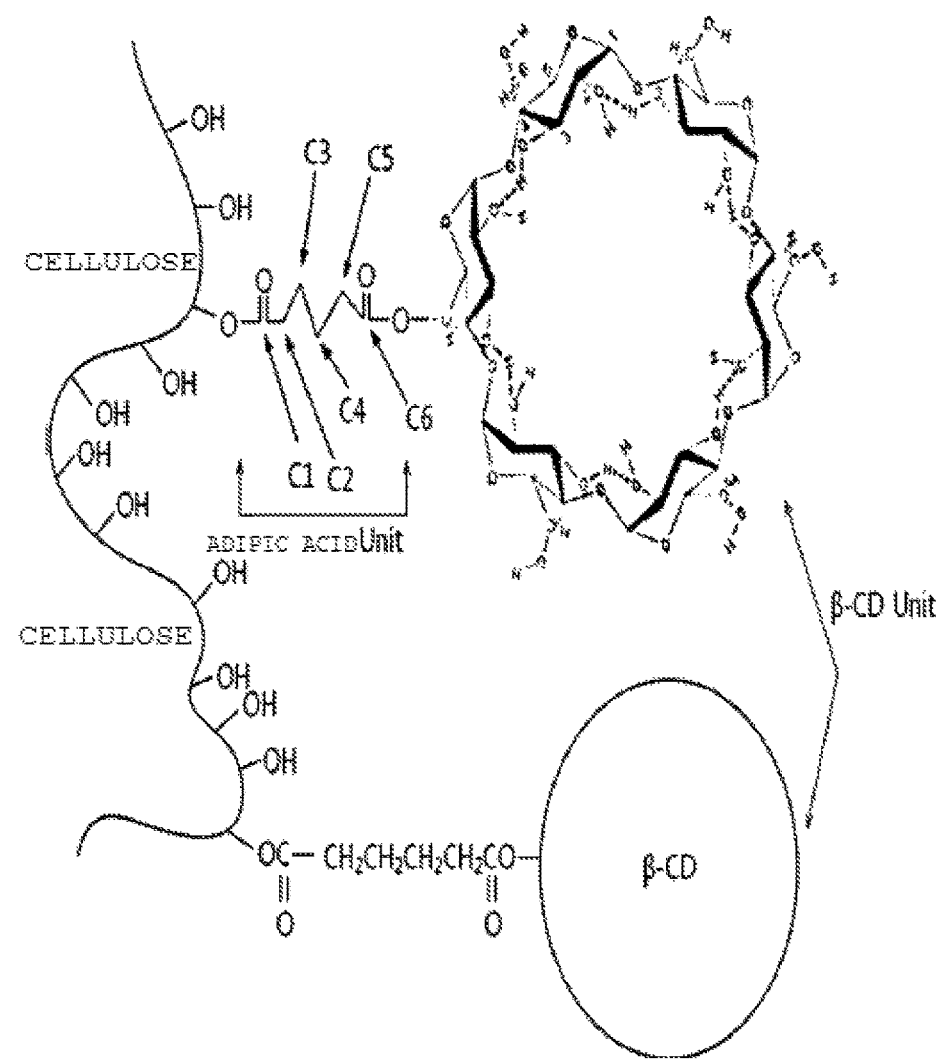

CELLULOSE-ADIPATE-#-CYCLODEXTRIN STRUCTURE, AND PREPARATION METHOD THEREFOR

TECHNICAL FIELD

The present invention relates to a structure composed of β-cyclodextrin, a linker and a supporter, and a preparation method thereof, and more particularly, to a cellulose-adipate-β-cyclodextrin structure and a preparation method thereof.

BACKGROUND ART

β-cyclodextrins a polysaccharide in which seven glucose units are linked to each other to form a ring. The structure of β-cyclodextrin is similar to that of a donut, and the inside thereof is hydrophobic while the outside is hydrophilic. Because of these structural features, β-cyclodextrin is used to capture various hydrophobic materials. In particular, it is known that cholesterol is trapped inside of β-cyclodextrin, forming a complex. Cholesterol is ingested through foods, and excessive intake is known to lead to adult diseases. Accordingly, studies on effective removal of cholesterol in foods have been conducted.

However, according to studies and patents to date, cholesterol is entrapped in a β-cyclodextrin-containing assembly, forming a complex, and the β-cyclodextrin-cholesterol complex forms a precipitate due to dissolution properties, such as an increase in hydrophobicity, and then the complex is separated. In this case, complete separation of cholesterol and β-cyclodextrin is difficult, and some β-cyclodextrin-containing assemblies that do not capture cholesterol are not separated and remain intact in milk.

Therefore, the present inventors have made efforts to solve this incomplete separation problem, and as a result, have developed an industrially viable structure composed of β-cyclodextrin, a linker and a supporter.

DISCLOSURE

Technical Problem

Therefore, the present invention has been made in view of the above problems, and it is an object of the present invention to provide a cellulose-adipate-β-cyclodextrin structure capable of effectively removing cholesterol from foods.

Technical Solution

The major object of the present invention is to provide a complex composed of β-cyclodextrin, a linker and a supporter, which is easily separated when bound to cholesterol or even when not bound to cholesterol. By introducing an insoluble supporter, the present invention improves upon a previous method in which β-cyclodextrin forms a complex with cholesterol in a dissolved state. As a result, the present inventors have been able to provide a structure in which β-cyclodextrin not bound to cholesterol can also be easily separated from a substrate such as milk.

One aspect of the present invention provides a cellulose-adipate-β-cyclodextrin structure, wherein one carboxyl group of adipic acid is linked to microcrystalline cellulose (MCC) via an ester bond and another carboxyl group remaining in the adipic acid is linked to β-cyclodextrin via an ester bond.

The cellulose-adipate-β-cyclodextrin structure of the present invention is composed of β-cyclodextrin physically adsorbing cholesterol, an insoluble supporter made of cellulose units, and a linker connecting the β-cyclodextrin and the support.

In addition, when β-cyclodextrin is linked directly to the surface of a supporter, β-cyclodextrin is generally over-cross-linked per unit area, resulting in an excessively high density. For this reason, there is a problem that the β-cyclodextrin has difficulty in binding to cholesterol in actual application. This problem was solved by introducing a linker between β-cyclodextrin and a supporter, which creates a space between β-cyclodextrin units. Many types of linkers may be used. In the present invention, adipic acid was used. The reasons are as follows. When an ester bond connecting a supporter to a linker and a linker to β-cyclodextrin is used continuously, depending on the pH of an object, some hydrolysis may occur and the hydrolyzed material will remain in a food. This can lead to safety problems. Thus, in the present invention, adipic acid was used as a linker which may not be a problem in this case. Adipic acid is separated from a support. In addition, since adipic acid is designated as a food additive, adipic acid itself is not a problem even when included in foods. Adipic acid has a chemical structure of $C_6H_{10}O_4$ and is a food additive having two carboxyl groups.

In addition, cellulose is widely used for foods and pharmaceuticals, and a product prepared by micro-crystallization of cellulose can be easily obtained. This product is commonly referred to as microcrystalline cellulose (MCC). MCC is composed of many glucose units as a basic constituent unit, and glucose is exposed on the surface of MCC. The hydroxyl group of glucose can be used to link with a linker.

In the cellulose-adipate-β-cyclodextrin structure of the present invention, the microcrystalline cellulose is preferably puffed. Puffing may be performed using methods commonly used in the art. For example, microcrystalline cellulose is puffed by heating to 150 to 450° C. to form a high pressure and then instantaneously removing the high pressure. In this process, the microcrystalline cellulose expands and becomes a porous structure, thereby providing a large surface area and improving an adsorption effect. When heating temperature exceeds 450° C., carbonization occurs due to heat, and microcrystalline cellulose may turn brown. When heating temperature is below 150° C., puffing effect may be reduced. However, the chemical properties of the surface of microcrystalline cellulose are not changed by puffing.

In the cellulose-adipate-β-cyclodextrin structure of the present invention, the microcrystalline cellulose is preferably 0.1 to 1.5 mm, more preferably 0.5 to 1.0 mm in size. The size of the MCC used does not affect whether the configuration of this system is established. However, since the size of particles is proportional to the ease of separation, it may be advantageous that the particle size is large. On the other hand, larger particles have relatively low binding capacity, and thus a large amount of particles may be consumed to achieve some effect. When the size of MCC is larger than 1.5, binding capacity with respect to a unit weight tends to be lowered and thus, the efficiency of an entire system is lowered. When the size of MCC is smaller than 0.1 mm, it is difficult to separate easily by simple sedimentation, but binding capacity per unit area may be rather increased.

Another aspect of the present invention provides a method of preparing a cellulose-adipate-β-cyclodextrin structure, the method including (A) a step of preparing an intermediate by reacting microcrystalline cellulose with adipic acid under alkaline conditions; (B) a step of preparing a cellulose-adipate-β-cyclodextrin complex by adding β-cyclodextrin to the intermediate after step (A); and (C) a step of washing and collecting the complex.

According to the method of the present invention, in step (A), the microcrystalline cellulose and the adipic acid are preferably added in a weight ratio of 1:1 to 1:10 and reacted under alkaline conditions. In this process, adipic acid that binds to microcrystalline cellulose may form a single bond or adipic acid may form bonds as a polymeric phase in which adipic acid is polymerized. Binding adipic acid to microcrystalline cellulose may reduce steric hindrance in the process of removing cholesterol using the structure of the present invention, and thus improve binding efficiency between cholesterol and β-cyclodextrin. In addition, when separated, adipic acid is again the original adipic acid, so the use of microcrystalline cellulose and the adipic acid complexes does not affect safety.

According to the method of the present invention, in step (B), the β-cyclodextrin is preferably added in a weight ratio of 3 to 20 when the weight of microcrystalline cellulose is set to 1. After the reaction, the cellulose-adipate-β-cyclodextrin structure of the present invention may be easily separated due to insoluble nature thereof.

According to the present invention, the cellulose-adipate-β-cyclodextrin structure is insoluble in water, and most foods subject to cholesterol removal are in liquid form, such as milk, yolk sac and other animal oils. In addition, since the structure of the present invention bound to cholesterol is a solid, a cholesterol-structure assembly may be separated and cholesterol may be removed. Furthermore, the structure may be easily reused by removing cholesterol from a cholesterol-structure assembly.

Still another aspect of the present invention provides a method of removing cholesterol from a food, the method including (A) a step of filling a column with the cellulose-adipate-β-cyclodextrin structure of the present invention; and (B) a step of passing a cholesterol-containing food through the column or a method of removing cholesterol from a food by suspending the cellulose-adipate-β-cyclodextrin structure in a liquefied food.

The cellulose-adipate-β-cyclodextrin structure of the present invention may be prepared in a form packed in a column or suspended in a liquid phase, and may be used to remove cholesterol from foods by binding to cholesterol. Cholesterol and the structure may be easily separated using general methods, such as filtration and centrifugation. Milk treated by the method of the present invention is cholesterol-free milk and may be used as a food or a raw material to help promote and maintain health.

Advantageous Effects

The cellulose-adipate-β-cyclodextrin structure of the present invention is effective in removing cholesterol from foods, and the use of the cellulose-adipate-β-cyclodextrin structure can reduce the onset of adult and chronic diseases due to excessive intake of cholesterol, thereby contributing to maintenance, recovery and promotion of health.

DESCRIPTION OF DRAWINGS

FIG. 1 illustrates a method of forming linkages for preparing a cellulose-adipate-β-cyclodextrin structure.

BEST MODE

Hereinafter, the present invention will be described in more detail with reference to the following examples. The scope of the present invention is not limited to the following examples and covers modifications of the technical spirit substantially equivalent thereto.

Example 1: Preparation of Cellulose-Adipate-β-Cyclodextrin Structure

In this example, a process for preparing a cellulose-adipate-β-cyclodextrin structure is described.

100 g of microcrystalline cellulose having a size of 0.5 to 1.0 mm was prepared, and 1 L water was added to the prepared microcrystalline cellulose to hydrate. After hydration, 1 M NaOH was added to the hydrated microcrystalline cellulose, and pH was adjusted by adding an alkali while mixing, and the same time, 1 L of an aqueous solution containing 5% (w/v) adipic acid was slowly added over 30 minutes. In this process, esterification between the hydroxyl group of microcrystalline cellulose and the carboxyl group of adipic acid occurred, and as a result, an intermediate in which adipic acid is linked to microcrystalline cellulose was generated. β-cyclodextrin was dissolved in water at a ratio of 10% (w/v), heated to 70° C. and slowly added to a vessel containing the intermediate produced by the reaction of microcrystalline cellulose with adipic acid with stirring. As a result, a cellulose-adipate-β-cyclodextrin complex was prepared.

Since the prepared complex was insoluble, the complex was washed with purified water and harvested to obtain a pure cellulose-adipate-β-cyclodextrin structure. In addition, since unreactive residues were water soluble and thus completely removed by the washing procedure.

Experimental Example 1: Measurement of Effect of Cellulose-Adipate-β-Cyclodextrin Structure on Removing Cholesterol In this experimental example, the effect of the cellulose-adipate-β-cyclodextrin structure obtained in Example 1 on removing cholesterol is investigated.

A column filled with the cellulose-adipate-β-cyclodextrin structure and milk containing 20 mg of cholesterol per 100 g of milk were prepared. The temperature of the column was adjusted to 10° C., and the milk was passed from the bottom to the top of the column at an optimal flow rate of 1 vvh (volume/volume/hour). Cholesterol content contained in the milk passed through the column was measured. Measurement of cholesterol content was carried out using high-performance liquid chromatography coupled with an ELS detector.

As a result, after passing the milk through the column, cholesterol content was reduced from 20 mg/100 g to 0.7 mg/100 g, i.e., 96.5% of cholesterol was removed. In addition, when the column was continuously reused, it was confirmed that, after 10 times of reuses, the removal efficiency was maintained at about 90%.

Example 2: Preparation of Puffed Cellulose-Adipate-β-Cyclodextrin Structure

In this example, a process for preparing puffed cellulose-adipate-β-cyclodextrin structure is described.

The microcrystalline cellulose used in Example 1 was puffed by heating at 350° C. for 10 minutes to form a high pressure and instantaneously removing the high pressure. Thereafter, the following reaction was carried out in the same manner as described in Example 1 to obtain a puffed cellulose-adipate-β-cyclodextrin structure.

Experimental Example 2: Measurement of Effect of Puffed Cellulose-Adipate-β-Cyclodextrin Structure on Removing Cholesterol In this experimental example, the effect of the puffed cellulose-adipate-β-cyclodextrin structure obtained in Example 2 on removing cholesterol is investigated.

The puffed cellulose-adipate-β-cyclodextrin structure in Example 2 was used, and experiments were carried out in the same method as described in Experimental Example 1. As a result, the efficiency of the puffed cellulose-adipate-β-cyclodextrin structure on cholesterol removal was 98.4%.

In addition, the structure filled in a column was reusable, the structure can be reused immediately after removing treated milk and the efficiency of the structure was not lowered even when used up to 5 times.

Average removal efficiency was about 98±0.9%. When the structure was reused up to 6 to 10 times, average removal efficiency was 96±0.6%.

Accordingly, the structure of the present invention was able to be reused at least 10 times according to requirement for the removal efficiency of cholesterol. In addition, when compared to the cellulose-adipate-β-cyclodextrin structure in Example 1, the puffed microcrystalline cellulose exhibited higher efficiency for cholesterol removal, and was stable and able to be used continuously.

Experimental Example 3: Measurement of Effect of Puffed Cellulose-Adipate-β-Cyclodextrin Structure on Removing Cholesterol 30 g of the puffed cellulose-adipate-β-cyclodextrin structure described in Example 2 was added to 1 L milk containing 20 mg of cholesterol per 100 g of milk, mixed at 8° C. and 200 rpm for 15 minutes and then, filtered. When the cholesterol content of the filtered milk was measured, 97.3% of cholesterol was removed.

Accordingly, the structure of the present invention exhibited a cholesterol removing effect even when suspended in milk.

Experimental Example 4: Measurement of Effect of Puffed Cellulose-Adipate-β-Cyclodextrin Structure on Removing Cholesterol 50 g of the puffed cellulose-adipate-β-cyclodextrin structure described in Example 2 was added to a mixture containing 500 g of water and 500 g of separated egg yolks, mixed at 10° C. and 150 rpm for 20 minutes and filtered. Filtered egg yolks were sprayed and dried to obtain egg yolk powder.

The cholesterol content of the obtained egg yolk powder was 1.1 mg/100 g, and removal efficiency was 98%.

INDUSTRIAL APPLICABILITY

The present invention relates to a structure for removing cholesterol from foods. The structure of the present invention may be applied to remove cholesterol from foods and prepare foods with low cholesterol contents.

The invention claimed is:

1. A cellulose-adipate-β-cyclodextrin structure, wherein one carboxyl group of adipic acid is linked to microcrystalline cellulose via an ester bond and another carboxyl group remaining in the adipic acid is linked to β-cyclodextrin via an ester bond.

2. The cellulose-adipate-β-cyclodextrin structure according to claim 1, wherein the microcrystalline cellulose is puffed.

3. A method of removing cholesterol from a food, the method comprising:
(A) a step of filling a column with the cellulose-adipate-β-cyclodextrin structure of claim 2; and
(B) a step of passing a cholesterol-containing food through the column.

4. A method of removing cholesterol from a food, comprising:
suspending the cellulose-adipate-β-cyclodextrin structure of claim 2 in a liquefied food.

5. The cellulose-adipate-β-cyclodextrin structure according to claim 1, wherein the microcrystalline cellulose is 0.1 to 1.5 mm in size.

6. A method of removing cholesterol from a food, the method comprising:
(A) a step of filling a column with the cellulose-adipate-β-cyclodextrin structure of claim 5; and
(B) a step of passing a cholesterol-containing food through the column.

7. A method of removing cholesterol from a food, comprising:
suspending the cellulose-adipate-β-cyclodextrin structure of claim 5 in a liquefied food.

8. A method of removing cholesterol from a food, the method comprising:
(A) a step of filling a column with the cellulose-adipate-β-cyclodextrin structure of claim 1; and
(B) a step of passing a cholesterol-containing food through the column.

9. A method of removing cholesterol from a food, comprising:
suspending the cellulose-adipate-β-cyclodextrin structure of claim 1 in a liquefied food.

10. A method of preparing a cellulose-adipate-β-cyclodextrin structure, the method comprising (A) a step of preparing an intermediate by reacting microcrystalline cellulose with adipic acid under alkaline conditions; (B) a step of preparing a cellulose-adipate-β-cyclodextrin complex by adding β-cyclodextrin to the intermediate after step (A); and (C) a step of washing and collecting the complex.

11. The method according to claim 10, wherein, in step (A), the microcrystalline cellulose and the adipic acid are added in a weight ratio of 1:1 to 1:10 and reacted.

12. The method according to claim 10, wherein, in step (B), the β-cyclodextrin is added in a weight ratio of 3 to 20 when a weight of microcrystalline cellulose is set to 1.

* * * * *